United States Patent

Heisey et al.

[11] Patent Number: 5,971,034
[45] Date of Patent: Oct. 26, 1999

[54] THERMAL DUCT LINING INSULATION

[75] Inventors: Kenneth E. Heisey, Elizabethtown; Paul A. Hough, Lititz, both of Pa.

[73] Assignee: Armstrong World Industries, Inc., Lancaster, Pa.

[21] Appl. No.: 09/005,387

[22] Filed: Jan. 9, 1998

[51] Int. Cl.[6] .................................................. F16L 9/14
[52] U.S. Cl. ............................ 138/149; 138/DIG. 9; 138/141
[58] Field of Search ........................ 138/149, DIG. 9, 138/103, 137, 140, 141

[56] References Cited

U.S. PATENT DOCUMENTS

| | | | |
|---|---|---|---|
| 4,381,197 | 2/1983 | Chabrier | 138/149 X |
| 5,114,987 | 5/1992 | Cakmak | 524/84.1 |
| 5,381,511 | 1/1995 | Bahar | 138/104 X |
| 5,417,901 | 5/1995 | Hartman et al. | 264/45.5 |

*Primary Examiner*—Patrick Brinson

[57] ABSTRACT

A duct lining insulation system for lining variable air volume boxes, air handling units, and ducts for heat ventilation and air conditioning has a sheet of a flexible, closed cell foam composition, said sheet having a face with a substantially smooth surface and having a coating of a pressure sensitive adhesive on a second face of the sheet, further providing that the pressure sensitive adhesive has a volatile content that is sufficiently low so that the adhesive gives off substantially no volatiles.

17 Claims, 1 Drawing Sheet

THERMAL DUCT LINING INSULATION

BACKGROUND OF THE INVENTION

Field of the Invention

Duct lining insulation for lining variable air volume boxes, air handling units, and ducts for heat ventilation and air conditioning is provided.

Although there is a wide variety of insulative materials available, insulation which is suitable as duct lining is extremely limited due to the rigorous requirements which duct lining materials should ideally meet. For the best duct lining insulation, this insulation should: 1) give off substantially no volatile, 2) give off substantially no fiber, 3) have the exposed surfaces of the insulation be smooth so that it presents a poor surface for air-borne contaminates to stick to, 4) not be water wicking (absorbent), and 5) be capable of fixing the insulation to the duct surface. In addition to this, it would be even more advantageous to have an efficient insulating material with a low thermal conductivity to allow thin layers to be used, thus taking up less space.

Fiberglass is presently used as duct lining insulation. The fiberglass, however, does tend to take up water. While this attraction to water is a disadvantage, the ability to absorb water allows water based adhesives to be used to fix the fiberglass insulation to the duct. The use of water based adhesives avoids the problem of volatile which other types of adhesives would have. The fiberglass itself, furthermore, must be wrapped or coated to obtain a smooth surface and to contain the fibers of glass which otherwise would be given off.

It would, however, be advantageous to be able to use a more efficient insulation than fiberglass which would allow thinner layers of insulation to be used, provided, however that such an insulation which would also meet the other requirements for duct lining insulation. Accordingly, it is an object of the present invention to provide an insulation system using more efficient insulation which also meets the above listed requirements for duct lining insulation.

SUMMARY OF THE INVENTION

A duct lining insulation system comprises a sheet of a flexible, closed cell foam composition, said sheet having a face with a substantially smooth surface and having a coating of a pressure sensitive adhesive on a second face of the sheet, further providing that the pressure sensitive adhesive has a volatile content that is sufficiently low so that the adhesive gives off substantially no volatiles.

The flexible, closed cell foam can be an elastomer or a polymer, although the elastomer composition is preferred since, advantageously, it can provide better fire and smoke standards than polymers such as polyolefins and polyurethane, and can hold the adhesive better than polymers such as polyethylene. Most preferably, the elastomer will be an elastomer containing a nitrile rubber and polyvinyl chloride.

DETAILED DESCRIPTION

Figure 1:
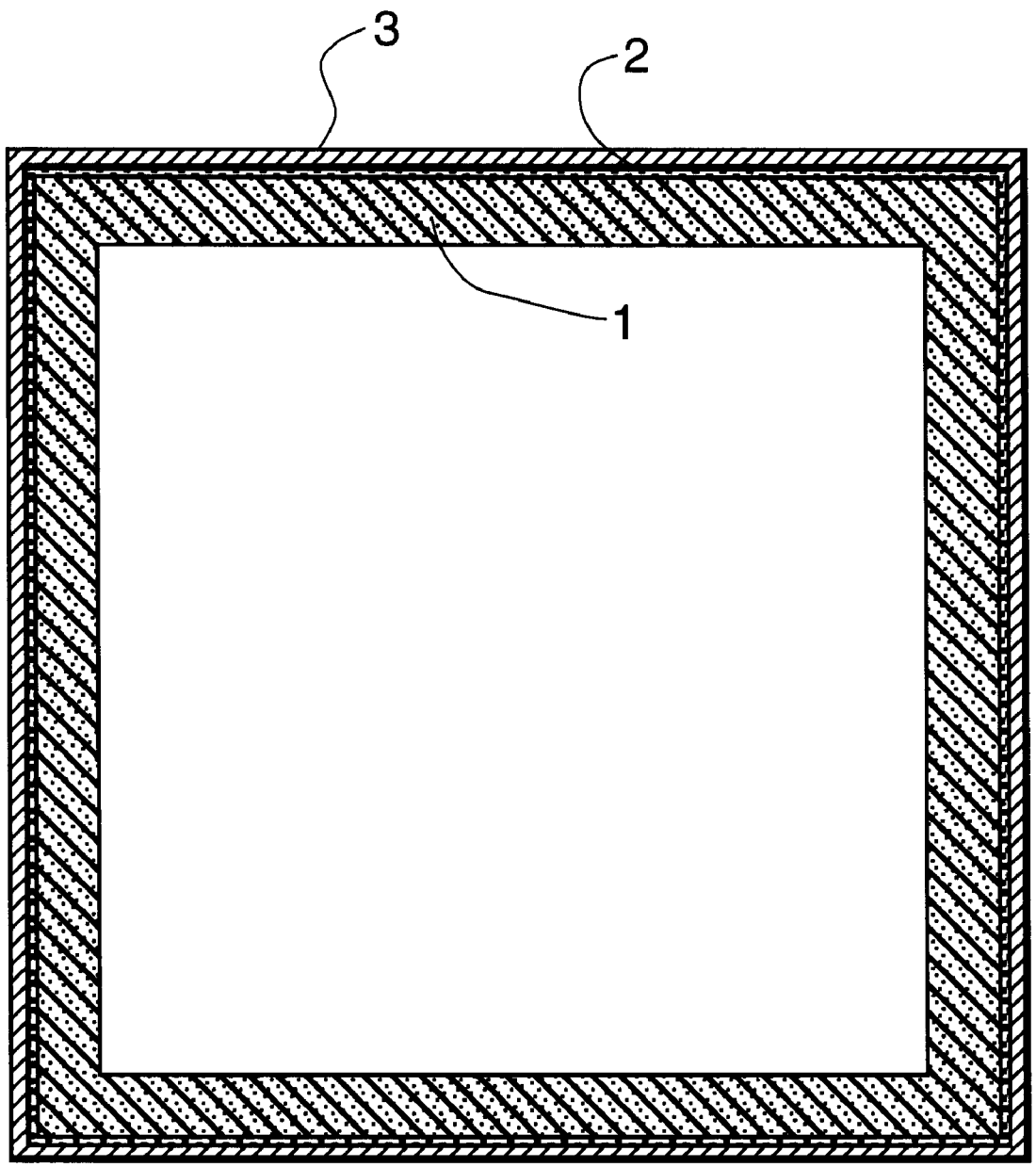
FIG. 1 is a duct outer surface (3), a contact adhesive (2) and a foam insulation (1).

The pressure sensitive adhesive called for by the present invention must give off substantially no volatiles. It has been discovered that solvent-based polymer adhesives can be applied and then heated to drive off the solvent volatiles. The volatiles can be reduced to a sufficiently low concentration so that there is substantially no volatile emission at room temperature. To achieve this, the adhesive is heated for a sufficient time and at a sufficiently high temperature to reduce the volatile content of the adhesive to this level. Suitably, the volatile content of the adhesive is less than about 5% by weight of the adhesive. Preferably the volatile content is a maximum of about 2% by weight of the adhesive.

One adhesive which can be prepared so that it has this low a concentration of volatiles is a self crosslinking acrylic polymer. The solvents used with the acrylic polymer adhesive preferably are selected from the group consisting of ethyl acetate, isopropanol, toluene, acetone, and mixtures thereof. Preferably the polymer is heated during the curing step of adhesive preparation. While the acrylic is crosslinking the adhesive mixture is exposed to hot air at high velocity to remove the volatiles.

Crosslinked acrylic polymer adhesive can be obtained commercially (MACtac MP-485 from Mactac).

Foam polymers and elastomers are well known, and can be prepared according to methods known in the art. Elastomer foams, for example can be prepared according to the methods found described in "Rubber Technology" edited by Maurice Morton, published by Van Nostrand Reinhold (87), or in U.S. Pat. No. 5,114,987.

The polymer or elastomer for the present invention, however must be flexible and closed cell. As duct insulation, the foam suitably has a maximum thermal conductivity of about 0.0576 watt/meter ° K. (W/M° K.), and preferably it is a maximum of about 0.0504 W/M° K. The preparation of such polymer or elastomer foams is well known, or suitable foams of this nature can be commercially obtained.

The foam should be at least about ¼ inch thick, and preferably it is at least about ⅜ inch thick. For most insulation needs the duct insulation can be set at a sheet thickness of up to about 2.5 inches thick.

Preferably the foam used is an elastomer, and most preferably it is a nitrile and polyvinyl chloride elastomer foam composition. These elastomers are preferred as duct insulation since they can be given excellent fire and smoke properties. This can be done by the addition of materials selected from the group consisting of aluminum trihydrate (alumina), an antimony fire retardant such as antimony trihydrate, a halogen compound, and mixtures thereof.

The standard test method for surface burning characteristics of building materials, ASTM E-84, can be used to determine the fire and smoke characteristics. Preferred duct insulation of the present invention will have a smoke developed index of 50 or less and a flame spread index of 25 or less. These levels can be achieved by using an elastomer blend containing nitrile rubber and PVC (polyvinyl chloride), with from about 24 to about 33% by weight of aluminum trioxide and from about 0.25 to about 1.25% by weight of antimony trioxide.

Suitable elastomer blend foams include a nitrile rubber at an amount in the range of from about 10 to about 27% by wt, PVC at an amount in the range of from about 14 to about 18% by wt. In such elastomers plasticizers can be used at an amount in the range of from about 10 to about 16% by wt. fillers including carbon black and the aluminum trioxide and antimony trioxide be used at an amount in the range of from about 24 to about 37% by wt, processing aid and antioxidant package can be used at an amount in the range of from about 2 to about 7% by wt, curing agent can be used at an amount in the range of from about 1 to about 5% by wt, and blowing agent can be used at an amount in the range of from about 10 to about 14% by wt.

The preferred duct insulation of the present invention will also pass the hot surface test, ASTM C-411, at 250° F. The nitrile rubber and PVC elastomer is preferably used when it is desired to have a foam insulation that will pass this test.

The foam insulation of the present invention preferably has a density in the range of from about 3 to about 4.5.

EXAMPLES

1. A highly preferred embodiment of the present invention is an elastomer foam of 100 parts by wt. of nitrile rubber, 82 phr (parts by weight per hundred parts by weight of rubber) of PVC, 187 phr of alumina, and 3 phr of antimony trioxide which has a density of 3.5 (lb/ft$^3$). The following ingredients can be mixed together using the amounts indicated: 100 parts by wt. of nitrile rubber, PVC, plasticizers 50–130 phr; alumina (aluminum trioxide); antimony trioxide; fillers (including extenders) 15–35 phr; processing aid and antioxidant package 12–48 phr; curing package 5–35 phr and blowing agent 50–100 phr. After mixing the homogeneous blend is extruded into a sheet, the sheet is heated in a multistage oven including a pre-cure stage of 225–275° F. and a cure and foam stage of 280–340° F. The foam obtained, having a 3.5 (lb/ft$^3$) density, is then cut to the size needed as duct insulation and a layer of MACtac MP-485 acrylic polymer adhesive can be applied to one face of the elastomer foam sheet. The insulation produced is then ready to be installed.

2. Using 100 parts by weight of nitrile rubber and 82 parts by weight of PVC with the plasticizer, 187 parts by weight of alumina, 3 parts by weight of antimony trioxide, filler and carbon black, a processing aid package, antioxidants, curing agent, and a sufficient amount of blowing agent to produce a foam having a density of approximately 3.5 pounds per cubic foot (lb/ft$^3$), the foam was prepared. These ingredients were first mixed in a Branbury mixer, and after obtaining a homogeneous blend the mixture was fed into a sheeting mill. The sheet was stripped off, cooled, and was then fed into an extruder. A sheet of the uncured mix was extruded. The sheet was then fed into a multi-stage oven and was cured and foamed. The oven temperature for the pre-cure stage was 225–275° F. and the temperature for the cure and foam stage was 280–340° F.

The foam obtained was cooled, cut to the size needed as duct lining, and a layer of MACtac MP-485 acrylic polymer adhesive was applied to one face of the elastomer foam sheet. The duct insulation produced was then ready to be attached to the walls of any duct.

We claim:

1. Duct lining thermal insulation comprises a sheet of a flexible, closed cell foam composition, said sheet having a face with a substantially smooth surface and having a coating of a pressure sensitive adhesive on a second face of the sheet, further providing that the pressure sensitive adhesive has a volatile content that is sufficiently low so that the adhesive gives off substantially no volatiles.

2. The insulation of claim 1 wherein the adhesive has a volatile content less than about 5% by weight.

3. The insulation of claim 1 wherein the adhesive has a volatile content of 2% by weight or less.

4. The insulation of claim 1 wherein the foam has a maximum thermal conductivity of about 0.0576 watt/meter° K.

5. The insulation of claim 1 wherein the duct insulation has a smoke developed index of 50 or less.

6. The insulation of claim 1 wherein the duct insulation has a flame spread index of 25 or less.

7. The insulation of claim 1 wherein the foam is an elastomer.

8. The insulation of claim 1 wherein the foam is an elastomer containing polyvinyl chloride and a nitrile rubber.

9. The insulation of claim 1 wherein the adhesive is a self crosslinking acrylic polymer.

10. The insulation of claim 1 wherein the adhesive is a self crosslinking acrylic polymer having a volatile content of about 2% or less.

11. The insulation of claim 10 wherein the volatiles are selected from the group consisting of ethyl acetate, isopropanol, toluene, acetone and mixtures thereof.

12. The insulation of claim 1 which lines: 1) an air volume box, 2) an air handling unit, 3) a heat ventilation duct, or 4) an air conditioning duct.

13. The insulation of claim 1 wherein the foam is an elastomer foam containing nitrile rubber and polyvinyl chloride.

14. The insulation of claim 13 wherein the nitrile rubber is present at an amount in the range of from about 10% by weight to about 27% by weight and the polyvinyl chloride is present at an amount in the range of from about 14 to about 18%.

15. The insulation of claim 13 which further has aluminum trioxide at an amount in the range of from about 24% by weight to about 33% by weight and antimony trioxide at an amount in the range of from about 0.25 to about 1.25%.

16. The insulation of claim 13 which passes the hot surface test, ASTM C-411, at 250° F.

17. The insulation of claim 15 which has a smoke developed index of 50 or less and a flame spread index of 25 or less.

* * * * *